(12) United States Patent
Florin et al.

(10) Patent No.: US 7,602,970 B2
(45) Date of Patent: Oct. 13, 2009

(54) SYSTEM AND METHOD FOR KALMAN FILTERING IN VASCULAR SEGMENTATION

(75) Inventors: Charles Florin, Princeton, NJ (US); James P. Williams, Princeton Junction, NJ (US); Nikolaos Paragios, Vincennes (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 750 days.

(21) Appl. No.: 11/374,794

(22) Filed: Mar. 14, 2006

(65) Prior Publication Data

US 2006/0251304 A1    Nov. 9, 2006

Related U.S. Application Data

(60) Provisional application No. 60/663,811, filed on Mar. 21, 2005.

(51) Int. Cl.
  *G06K 9/34* (2006.01)
  *G06K 9/00* (2006.01)
(52) U.S. Cl. .................... 382/173; 382/128; 382/154
(58) Field of Classification Search ................ 382/173, 382/154, 128–132, 260–261
See application file for complete search history.

(56) References Cited

U.S. PATENT DOCUMENTS

2005/0249391 A1*  11/2005  Kimmel et al. ............. 382/128
2006/0188139 A1*  8/2006   Khamene et al. ........... 382/130

OTHER PUBLICATIONS

Aylward et al., Intensity Ridge and Widths for Tubular Object Segmentation and Description, IEEE 0-8186-7367-2/96, pp. 131138.*
Certis R. R., XP-002399678, 05-03, pp. 1-18.*

* cited by examiner

*Primary Examiner*—Sherali Ishrat
(74) *Attorney, Agent, or Firm*—Donald B. Paschburg; F. Chau & Associates, LLC

(57) ABSTRACT

A method of segmenting tubular structures in digital images comprises providing a digitized image, selecting a point within an object for segmenting in the image, defining an initial state of the selected point in the object, performing an initial segmentation of a 2D cross section of the object based on the initial state, predicting a new state of said object about a new point that is a translation of said selected point along the object tangent, correcting said new state prediction based on a measurement of said new point in said image, and segmenting a 2D cross section of said object based on said new state.

25 Claims, 3 Drawing Sheets

SYSTEM AND METHOD FOR KALMAN FILTERING IN VASCULAR SEGMENTATION

CROSS REFERENCE TO RELATED UNITED STATES APPLICATION

This application claims priority from "Kalman Filter for Vascular Segmentation in 2D and 3D", U.S. Provisional Application No. 60/663,811 of Florin, et al., filed Mar. 21, 2005, the contents of which are incorporated herein by reference,

TECHNICAL FIELD

This invention is directed to the segmentation of tubular structures in medical imaging and computer vision applications.

DISCUSSION OF RELATED ART

Cardiovascular diseases are leading causes of death in the United States. Thus, there is a great demand for improved diagnostic tools to detect and measure anomalies in the cardiac muscle. Coronary arteries are thin vessels that feed the heart muscle with blood. Therefore, their segmentation provides a valuable diagnostic tool for clinicians interested in detecting calcifications and stenoses. Because of low-contrast conditions and the coronaries vicinity to the blood pool, segmentation is a difficult task. Computed Tomography (CT) and Magnetic Resonance (MR) imaging of the heart have become standard tools for medical diagnosis, resulting in a substantial number of patients being imaged.

Vessel segmentation techniques include model-free and model-based methods. Vessel enhancement approaches and differential geometry-driven methods do not segment vessels per se, but allow a better visualization. Region growing, flux maximization, morphological operators and skeleton-based techniques are more advanced vessel segmentation techniques.

Model-based techniques use prior knowledge and features to match a model with the input image and extract the vessels. Prior knowledge refers either to the whole structure or to the local vessel model. Tracking approaches recover the vessel centerline, given a starting condition, through processing information on the vessel cross section. Vessel template matching, generalized cylindrical models, as well as parametric and/or geometric deformable models are alternatives to vessel tracking and seek to minimize an objective function computed along the model. Level sets provide an established method to address such minimization. One can refer to the fast marching algorithm and its variant for vessel segmentation using the minimal path principle. To discourage leaking, a local shape term that constrains the diameter of the vessel has been proposed.

Existing approaches suffer from certain limitations. Local operators, region growing techniques, morphological filters as well as geometric contours might be very sensitive to local minima and fail to take into account prior knowledge on the form of the vessel. In addition, cylindrical models, parametric active contours and template matching techniques may not be well suited to account for the non-linearity of the vessel structure, and require particular handling of branchings and bifurcations. Tracking methods can often fail in the presence of missing and corrupted data, or sudden changes. Level sets are computationally time-consuming, and the Fast Marching algorithm loses local implicit function properties.

SUMMARY OF THE INVENTION

Exemplary embodiments of the invention as described herein generally include methods and systems for utilizing a recursive linear Kalman filter to segment vascular structures in 2D and 3D. A filter according to an embodiment of the invention works in a detection-correction framework, and is therefore robust to errors in the detection procedure. A filter according to an embodiment of the invention iteratively segments a vessel by cross section at each time step. Once the segmentation is complete for one given time step, the Kalman filter corrects the detection and jumps to the next time step/cross-section.

According to an aspect of the invention, there is provided a method for segmenting tubular structures in digital images comprising providing a digitized image comprising a plurality of intensities corresponding to a domain of points on a 3-dimensional grid, selecting a point within an object in said image, wherein said object is to be segmented, defining an initial state of said selected point of said object, performing an initial segmentation of a 2D cross section of said object based on said initial state, predicting a new state of said object about a new point that is a translation of said selected point along the object tangent, correcting said new state prediction based on a measurement of said new point in said image, and segmenting a 2D cross section of said object based on said new state.

According to a further aspect of the invention, the method comprises repeating the steps of predicting a new state of said object, correcting said new state prediction, and segmenting a 2D cross section of said object until the until the object has been completely segmented in said 3D image.

According to a further aspect of the invention, where a state of a point of an object includes a center position of a vessel, a local orientation of said vessel, a model of the vessel cross section, and a model of the intensity distribution of points within the vessel cross section.

According to a further aspect of the invention, the intensity distribution model comprises a mixture of two Gaussians with differing probability weights.

According to a further aspect of the invention, the cross section is segmented by a bi-threshold technique.

According to a further aspect of the invention, the bi-threshold technique comprises the steps of selecting two thresholds $T_1$ and $T_2$ wherein $T_1 > T_2$, and for each point in the cross section, if the point's intensity value is above $T_1$, segmenting said point, otherwise if the point's intensity value is above $T_2$, segmenting said point if at least one neighboring point's intensity value is above $T_1$.

According to a further aspect of the invention, $T_1 = 90\%\% \ (p_1 \% \ \mu_1 + p_2 \% \ \mu_2)$ and $T_2 = 75\%\% \ (p_1 \% \ \mu_1 + p_2 \% \ \mu_2)$, wherein $p_1$ and $p_2$ are the probability weights of the two Gaussians, and $\mu_1$ and $\mu_2$ are the mean values of the two Gaussians.

According to a further aspect of the invention, the method comprises initializing an error covariance of said initial state, wherein said covariance is associated with a Gaussian noise, predicting a new error covariance, and correcting said new error covariance prediction, wherein correcting said new state prediction is based on said error covariance prediction.

According to a further aspect of the invention, predicting a new state comprises applying a transition matrix to said current state according to $X_{t+1}^{predicted} = F_t X_t$, where X represents said state and F represents said transition matrix, and the predicted error covariance is $P_t^{predicted} = F_{t-1} P_{t-1} F_{t-1}^T + Q_{t-1}$, wherein P represents the error covariance and Q represents a Gaussian noise with zero mean.

According to a further aspect of the invention, the measurement is related to said predicted state according to $Z_t = X_t^{predicted} + V$, wherein Z represents the measurement of said state and V represents a Gaussian noise with zero mean, said corrected new state definition comprises $X_t^{corrected} = X_t^{predicted} + P_t^{predicted} (P_t^{predicted} + R_t)^{-1}(Z_t - X_t^{predicted})$, wherein R is a covariance associated with Gaussian noise V, and said corrected error covariance definition comprises $P_t^{corrected} = (I - P_t^{predicted} (P_t^{predicted} + R_t)^{-1}) P_t^{predicted}$, wherein I is the unit matrix.

According to a further aspect of the invention, the state vector X={x, y, z, x, y, z, ellipse, gaussian_mixture}, wherein {x,y,z} represent position of the object center, {x,y,z} represents the local orientation of the object, {ellipse} represents the cross section model, and {gaussian_mixture} represents the voxel intensity distribution of the object, and wherein said transition matrix F is $$\begin{pmatrix} 1 & 0 & 0 & \delta & 0 & 0 & 0 & 0 \\ 0 & 1 & 0 & 0 & \delta & 0 & 0 & 0 \\ 0 & 0 & 1 & 0 & 0 & \delta & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}$$

wherein $\delta$ is a spatial displacement along the object tangent line.

According to another aspect of the invention, there is provided a program storage device readable by a computer, tangibly embodying a program of instructions executable by the computer to perform the method steps for segmenting tubular structures in digital images.

DETAILED DESCRIPTION OF THE PREFERRED EMBODIMENTS

Figure 1:
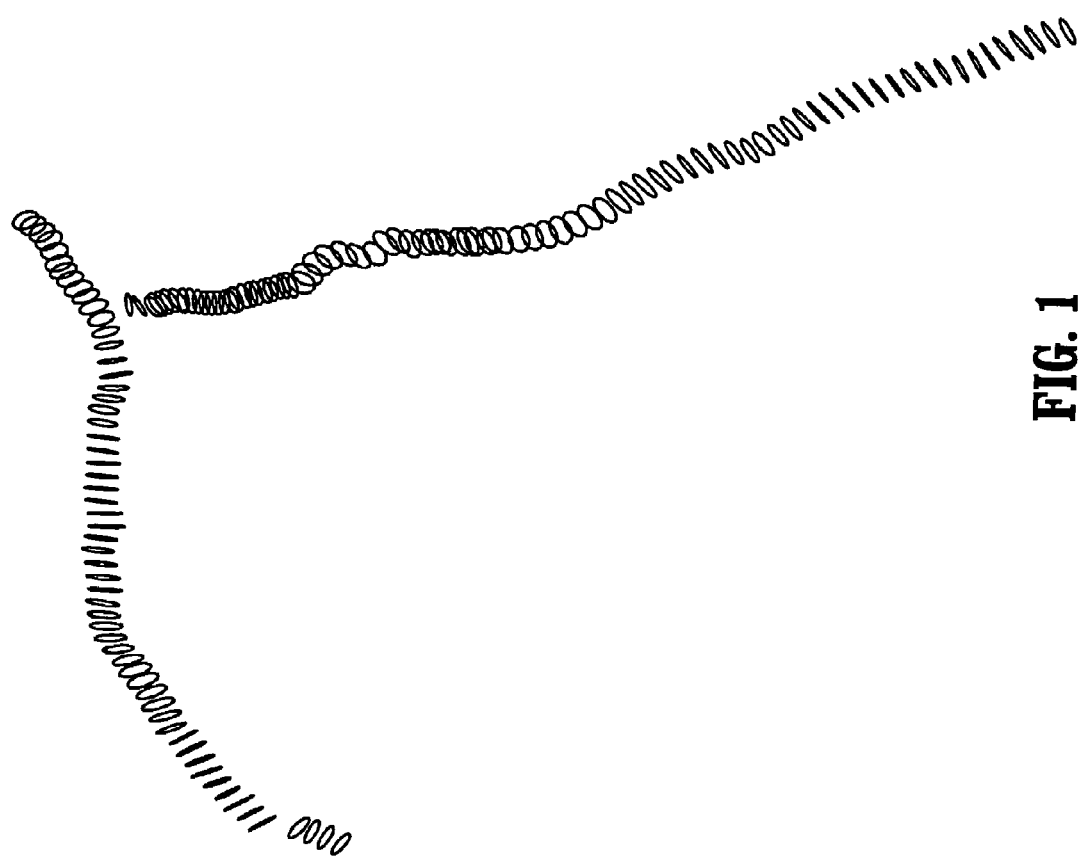
FIGS. 1 depicts a model of the left coronary artery by a set of ellipses derived using predicted/corrected Kalman states, according to an embodiment of the invention.

Exemplary embodiments of the invention as described herein generally include systems and methods for Kalman filtering in vascular segmentation. However, specific structural and functional details disclosed herein are merely representative for purposes of describing example embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

According to an embodiment of the invention, one can define the state of a vessel based on the position of the vessel center, the local orientation of the vessel, an elliptical model of the vessel cross section, and the intensity distribution of the vessel's voxels. At a given time step, given the state of the vessel (position, orientation, ellipse, voxel intensity distribution inside the vessel), the vessel cross section is segmented using a bi-threshold technique. A bi-thresholding technique relies on two parameters: $T_1$ and $T_2$, where $T_1 > T_2$. A voxel is segmented if its intensity is above $T_1$, or if it is above $T_2$ and one of the voxel's neighbor's intensity is above $T_1$. This method is both fast and reliable if a prior knowledge related to the pixels distribution is given.

According to an embodiment of the invention, a mixture of two Gaussians $g_1(\mu_1, \sigma_1)$ and $g_2(\mu_2, \sigma_2)$ with mean $\sigma$ and variance a models the pixel intensity distribution inside the vessel, with probabilities $p_1$ and $p_2$:

$$I(x) = p_1\% \, g_1(x) + p_2\% \, g_2(x)$$

According to an embodiment of the invention, one can use for the case of coronary arteries:

$$T_1 = 90\%\% \, (p_1\% \, \mu_1 + p_2 \mu_2),$$

$$T_2 = 75\%\% \, (p_1\% \, \mu_1 + p_2\% \, \mu_2).$$

These threshold values are sufficient to segment a vessel's cross-section. In certain cases, such as coronary arteries, other structures with similar intensities may be segmented as well. A simple connected component analysis can be used to filter them out, retaining only the vessel.

The scheme described above is used to correct a given assumption about the vessel location and its direction. In the following, $x_{k|k-1}$ denotes the assumption about the vessel description, at time step k, given past estimations up to time step k−1. From this assumption, the above scheme takes the assumed vessel cross-section, filters it using the bi-thresholding method, and obtains the actual vessel center location and vessel direction. For this reason the output of the above mentioned technique is referred to as a corrected state, and denoted $x_{k|k}$. In the following, a predictive scheme used to generate the hypothesis $x_{k|k-1}$, called Kalman Filter, is described.

A Kalman filter is an efficient recursive filter which estimates the state of a dynamic system from a series of incomplete and noisy measurements. An example of an application would be to provide accurate continuously-updated information about the position and velocity of an object given only a sequence of observations about its position, each of which includes some error. The Kalman filter exploits the dynamics of the target, which govern its time evolution, to remove the effects of the noise and get a good estimate of the location of the target at the present time (filtering), at a future time (prediction), or at a time in the past (interpolation or smoothing).

Kalman filters are based on linear algebra and the hidden Markov model. The underlying dynamical system is modeled as a Markov chain built on linear operators perturbed by Gaussian noise. The state of the system is represented as a vector of real numbers. At each discrete time increment, a linear operator is applied to the state to generate the new state, with some noise mixed in, and optionally some information from the controls on the system if they are known. Then, another linear operator mixed with more noise generates the visible outputs from the hidden state.

In order to use the Kalman filter to estimate the internal state of a process given only a sequence of noisy observations, one must model the process in accordance with the framework of the Kalman filter. The Kalman filter model assumes the true state at time k is evolved from the state at (k−1) according to $$x_k = F_k x_{k-1} + w_k,$$

where:

$F_k$ is the state transition model which is applied to the previous state $x_{k-1}$; and $w_k$ is the process noise which is assumed to be drawn from a zero mean multivariate normal distribution with covariance $Q_k$.

At time k an observation (or measurement) $z_k$ of the true state $x_k$ is made according to $$z_k = H_k x_k + v_k,$$

where $H_k$ is a matrix representing an observation model which maps the true state space into the observed space, and $v_k$ is the observation noise which is assumed to be zero mean Gaussian white noise with covariance $R_k$. The initial state, and the noise vectors at each step $\{x_0, w_1, \ldots, w_k, v_1 \ldots v_k\}$ are all assumed to be mutually independent. Although many real dynamical systems do not exactly fit this model, because the Kalman filter is designed to operate in the presence of noise, an approximate fit is often good enough for the filter to be very useful.

The Kalman filter is a recursive estimator. This means that only the estimated state from the previous time step and the current measurement are needed to compute the estimate for the current state. In contrast to a batch estimation technique, no history of observations and/or estimates are required. It is unusual in being purely a time domain filter; most filters are formulated in the frequency domain and then transformed back to the time domain for implementation.

The state of the filter is represented by two variables:

$\hat{x}_{k|k}$, the estimate of the state at time k; and $P_{k|k}$, the error covariance matrix, which is a measure of the estimated accuracy of the state estimate.

The Kalman filter has two distinct phases: predict and update. The predict phase uses the estimate from the previous timestep to produce an estimate of the current state:

$$\hat{x}_{k|k-1} = F_k \hat{x}_{k-1|k-1}, \text{ (predicted state)}$$

$$P_{k|k-1} = F_k P_{k-1|k-1} F_k^T + Q_k, \text{ (predicted estimate covariance)}$$

In the update phase, measurement information from the current timestep is used to refine this prediction to arrive at a new, (hopefully) more accurate estimate:

$$\tilde{y}_k = z_k - H_k \hat{x}_{k|k-1}, \text{ (innovation or measurement residual)}$$

$$S_k = H_k P_{k|k-1} H_k^T + R_k, \text{ (innovation (or residual) covariance)}$$

$$K_k = P_{k|k-1} H_k^T S_k^{-1}, \text{ (Kalman gain)}$$

$$\hat{x}_{k|k} = \hat{x}_{k|k-1} + K_k \tilde{y}_k, \text{ (updated state estimate)}$$

$$P_{k|k} = (I - K_k H_k) P_{k|k-1}. \text{ (updated estimate covariance)}$$

If the model is accurate, and the values for $\hat{x}_{0|0}$ and $P_{0|0}$ accurately reflect the distribution of the initial state values, then the following invariants are preserved. All estimates have mean error zero:

$$E[x_k - \hat{x}_{k|k}] = E[x_k - \hat{x}_{k|k-1}] = 0,$$

$$E[\tilde{y}_k] = 0;$$

and the covariance matrices accurately reflect the covariance of estimates:

$$P_{k|k} = \text{cov}(x_k - \hat{x}_{k|k}),$$

$$P_{k|k-1} = \text{cov}(x_k - \hat{x}_{k|k-1}),$$

$$S_k = \text{cov}(\tilde{y}_k).$$

Note that where $E[a]=0$, $cov(a)=E\lfloor aa^T \rfloor$.

Applying a Kalman filter correction according to an embodiment of the invention to vascular segmentation requires the following explicit formulation:

$$X_t = F \cdot X_{t-1} + W,$$

$$Z_t = H \cdot X_t + V,$$

where $X_t$ is the state of the vessel at time t, F is the transition matrix from time t to time (t+1), $Z_t$ is the observation at time t, and H is the observation model matrix that converts from state $X_t$ to observation $Z_t$. W and V represent Gaussian noise with zero mean and covariance Q and R.

Given the state of the vessel (location+orientation+intensity) at time t−1, the Kalman filter generates a hypothesis about the vessel future state for time t, denoted $X_{t|t-1}$. From this state $X_{t|t-1}$, one obtains the cross-section and segments it, e.g. with the bi-threshold technique, and corrects the assumption with the values (location+orientation+intensity) that are actually observed. This corrected state, denoted $X_{t|t}$, is in turn used to generate (via the Kalman filter) $X_{t+1|t}$.

In the case of coronary arteries, the state X and the observation Z are the same vectors, so the observation model matrix H is the identity matrix. The mean and variance of the noise W and V are determined by experiment. The case of coronary arteries, like many other vascular structures, can be modeled linearly. Since the state of a vessel can be defined by the position of the vessel center, the local orientation of the vessel, an elliptical model of the vessel cross section, and the intensity distribution of the vessel's voxels, a state vector can be represented by X={x, y, z, x, y, z, ellipse, gaussian_mixture}. Then, the transition matrix F is $$\begin{pmatrix} 1 & 0 & 0 & \delta & 0 & 0 & 0 & 0 \\ 0 & 1 & 0 & 0 & \delta & 0 & 0 & 0 \\ 0 & 0 & 1 & 0 & 0 & \delta & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}$$

where $\delta$ is the spatial displacement. The predicted update of the state vector is $$X_{t|t-1} = F_t X_{t-1|t-1}$$

or, in other words, $$x_{t+1} = x_t + \delta x,$$

$$y_{t+1} = y_t + \delta y,$$

$$z_{t+1} = z_t + \delta z.$$

The prediction of the states covariance matrix P is $$P_{t|t-1} = F_{t-1} P_{t-1|t-1} F_{t-1}^T + Q_{t-1}.$$

The Kalman gain control is $$K_t = P_{t|t-1} H_t^T (H_t P_{t|t-1} H_t^T + R_t)^{-1}.$$

The corrected state is $$X_{t|t} = X_{t|t-1} + K_t (Z_t - H_t X_{t|t-1}).$$

The corrected state covariance matrix is $$P_{t|t} = (I - K_t H_t) P_{t|t-1}.$$

In an embodiment of the invention for the case of coronary arteries, the state transition is linear, as the position is translated along the vessel tangent direction. In addition, since the observation model matrix H is the identity matrix, the Kalman gain control and the corrected state equations take on a simplified form:

$$K_t = P_{t|t-1} (P_{t|t-1} + R_t)^{-1}.$$

$$X_{t|t} = X_{t|t-1} + K_t (Z_t - X_{t|t-1}) = X_{t|t-1} + P_{t|t-1} (P_{t|t-1} + R_t)^{-1} V,$$

$$P_{t|t} = (I - P_{t|t-1} (P_{t|t-1} + R_t)^{-1}) P_{t|t-1}.$$

Figure 2:
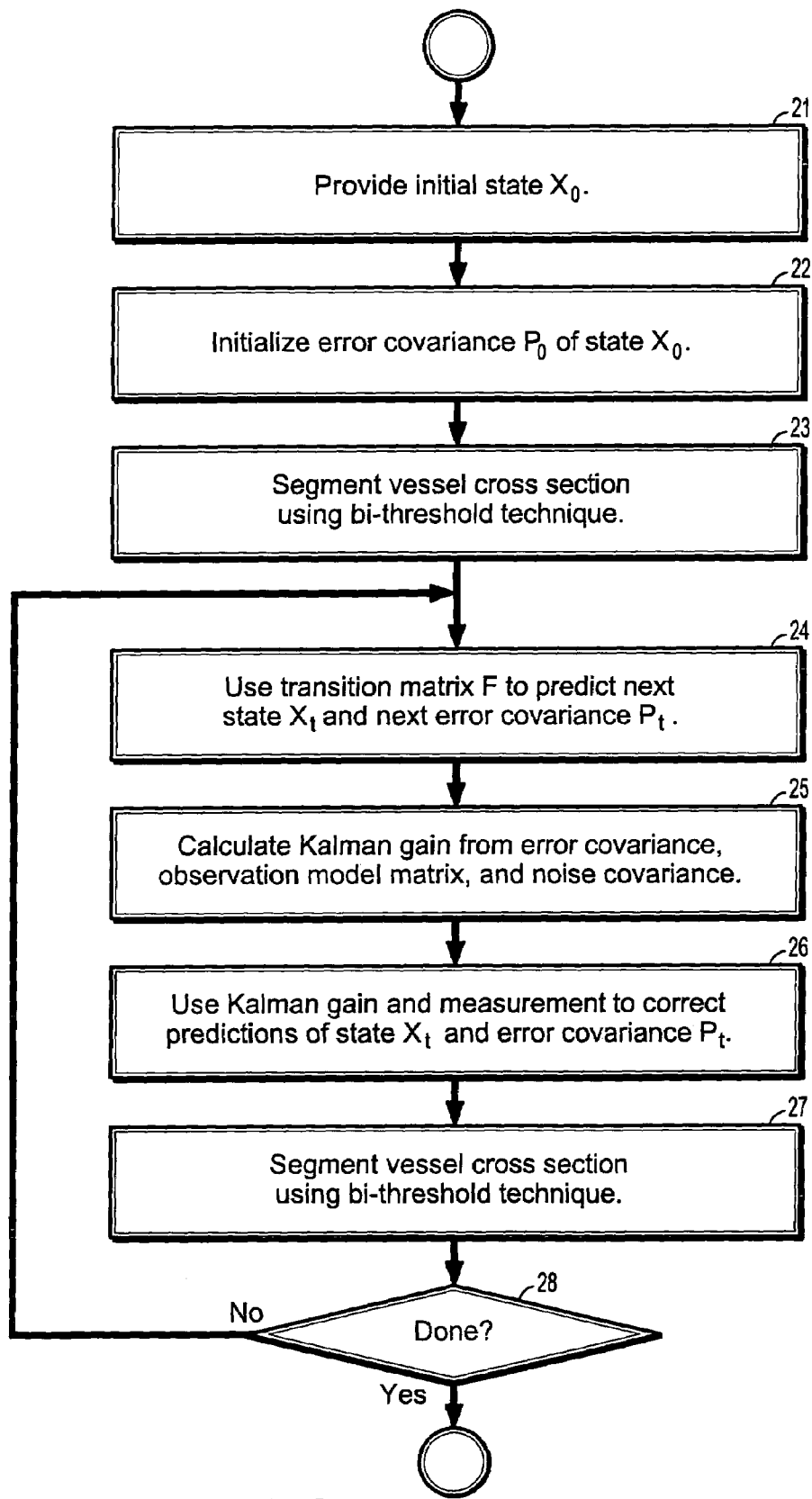
FIG. 2 is a flow chart of a Kalman filtering based segmentation method according to an embodiment of the invention.

For a more complicated model, when the transition is non-linear, a local linearization would be necessary to write the state transition using matrices. Vessel branching is essentially non-linear, and since the Kalman filter is linear, it needs extra heuristics to handle branching. The extra heuristics can be any branch detection scheme such as are well known in the art. Exemplary, non-limiting branch detection schemes include template matching, which matches a template of a branching to the image, user-entry detection, where a user clicks on a branching in the image, or particle filtering. A flow chart of a Kalman filtering based segmentation method according to an embodiment of the invention is shown in FIG. 2. From a volumetric image, an initial state $X_0$ of a vessel, i.e. the position of the vessel center, the local orientation of the vessel, an elliptical model of the vessel cross section, and a model of the intensity distribution of the vessel's voxels, is provided at step 21. An exemplary, non-limiting intensity distribution is modeled by a sum of two Gaussians with differing probabilities. According to an embodiment of the invention, this initial vessel state could be determined from a measurement based on a user's selection of an image point within the vessel structure to be segmented. According to another embodiment of the invention, a sequence of vessel position measurements can be provided to the Kalman filter. An initial estimate of the error covariance $P_0$ of the initial state is provided at step 22. In addition, the state transition matrix F and the observation model matrix H for the Kalman filter are defined, and the respective noise terms W and V are estimated. At step 23, the 2D cross section defined by the vessel state $X_0$ is segmented to identify the vessel structure. According to an embodiment of the invention, this segmentation is performed by a bi-threshold technique.

At step 24, the predicted updates of the vessel state Z and error covariance matrix P are estimated from the previous values using the Kalman filter matrices F and H. The vessel state update is a prediction of the next vessel center position translated along the vessel tangent direction, along with its local orientation, vessel cross section model, and voxel intensity distribution within the 3D image volume. The vessel tangent direction is determined by a vector placed at the vessel center position whose direction is determined by the local orientation. The Kalman gain matrix K for the current time step is calculated based on a measurement of the vessel state at step 25, and is used at step 26 to correct the predicted values of the vessel state X and error covariance P. The corrected vessel state is used at step 27 to segment another 2D cross section of the structure. If, at step 28, it is determined that the vessel has been completely segmented, the Kalman filter terminates, otherwise the filter process returns to step 24 to predict the next vessel state. The structure is defined by the sequence of 2D segmented cross sections.

Experimental tests of methods according to embodiments of the invention were conducted on 34 patients. A Kalman filter based vascular segmentation can successfully recover both pathological and non-pathological cases. Each state provides an estimated/corrected model of the vessel: position, direction, and elliptic model. If the exact boundary is to be recovered, an additional step can be performed. FIG. 1 depicts a model of the left coronary artery derived using predicted/corrected Kalman states. The vessel is modeled by a set of ellipses.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
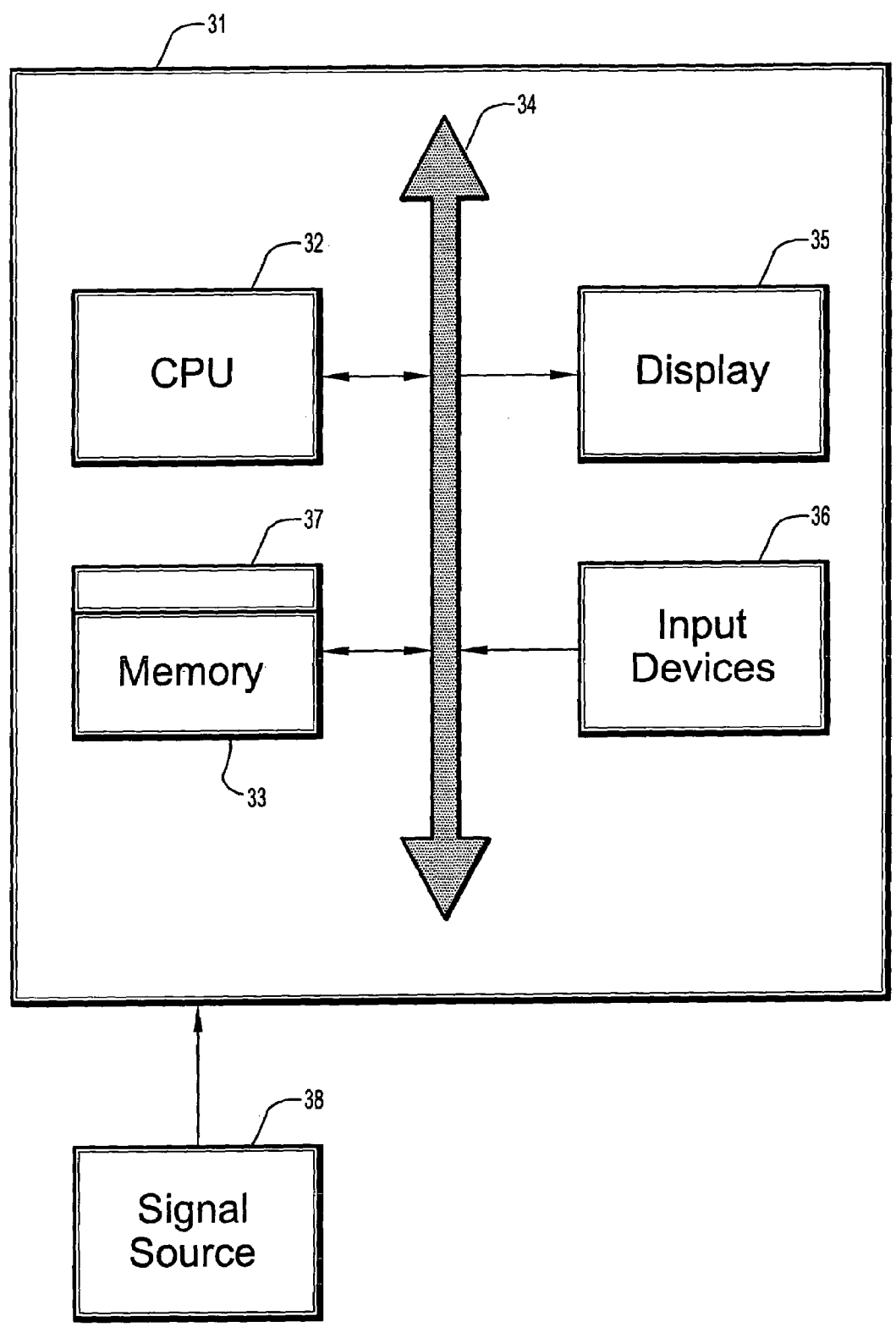
FIG. 3 is a block diagram of an exemplary computer system for implementing a Kalman filtering based segmentation method according to an embodiment of the invention.

FIG. 3 is a block diagram of an exemplary computer system for implementing a Kalman filter based vascular segmentation according to an embodiment of the invention. Referring now to FIG. 3, a computer system 31 for implementing the present invention can comprise, inter alia, a central processing unit (CPU) 32, a memory 33 and an input/output (I/O) interface 34. The computer system 31 is generally coupled through the I/O interface 34 to a display 35 and various input devices 36 such as a mouse and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed by the CPU 32 to process the signal from the signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of segmenting tubular structures in digital images, comprising the steps of:

providing a digitized image comprising a plurality of intensities corresponding to a domain of points on a 3-dimensional grid;

selecting a point within an object in said image, wherein said object is to be segmented;

defining an initial state of said selected point of said object;

performing an initial segmentation of a 2D cross section of said object based on said initial state;

predicting a new state of said object about a new point that is a translation of said selected point along the object tangent;

correcting said new state prediction based on a measurement of said new point in said image; and segmenting a 2D cross section of said object based on said new state.

2. The method of claim 1, further comprising repeating the steps of predicting a new state of said object, correcting said new state prediction, and segmenting a 2D cross section of said object until the until the object has been completely segmented in said 3D image.

3. The method of claim 1, wherein a state of a point of an object includes a center position of a vessel, a local orientation of said vessel, a model of the vessel cross section, and a model of the intensity distribution of points within the vessel cross section.

4. The method of claim 3, wherein the intensity distribution model comprises a mixture of two Gaussians with differing probability weights.

5. The method of claim 4, wherein said cross section is segmented by a bi-threshold technique.

6. The method of claim 5, wherein said bi-threshold technique comprises the steps of selecting two thresholds $T_1$ and $T_2$ wherein $T_1 > T_2$, and for each point in the cross section, if the point's intensity value is above $T_1$, segmenting said point, otherwise if the point's intensity value is above $T_2$, segmenting said point if at least one neighboring point's intensity value is above $T_1$.

7. The method of claim 1, wherein $T_1 = 90\%\%(p_1\%\mu_1 + p_2\%\mu_2)$ and $T_2 = 75\%\%(p_1\%\mu_1 + p_2\%\mu_2)$, wherein $p_1$ and $P_2$ are the probability weights of the two Gaussians, and $\mu_1$ and $\mu_2$ are the mean values of the two Gaussians.

8. The method of claim 1, further comprising initializing an error covariance of said initial state, wherein said covariance is associated with a Gaussian noise, predicting a new error covariance, and correcting said new error covariance prediction, wherein correcting said new state prediction is based on said error covariance prediction.

9. The method of claim 8, wherein predicting a new state comprises applying a transition matrix to said current state according to $X_{t+1}^{predicted} = F_t X_t$, where X represents said state and F represents said transition matrix, and the predicted error covariance is $P_t^{predicted} = F_{t-1} P_{t-1} F_{t-1}^T + Q_{t-1}$, wherein P represents the error covariance and Q represents a Gaussian noise with zero mean.

10. The method of claim 9, wherein said measurement is related to said predicted state according to $Z_t = X_t^{predicted} + V$, wherein Z represents the measurement of said state and V represents a Gaussian noise with zero mean, said corrected new state definition comprises $X_t^{corrected} = X_t^{predicted} + P_t^{predicted}(P_t^{predicted} + R_t)^{-1}(Z_t - X_t^{predicted})$, wherein R is a covariance associated with Gaussian noise V, and said corrected error covariance definition comprises $P_t^{corrected} = (I - P_t^{predicted}(P_t^{predicted} + R_t)^{-1})P_t^{predicted}$, wherein I is the unit matrix.

11. The method of claim 9, wherein said state vector X={x, y, z, x, y, z, ellipse, gaussian_mixture}, wherein {x,y,z} represent position of the object center, {x,y,z} represents the local orientation of the object, {ellipse} represents the cross section model, and {gaussian_mixture} represents the voxel intensity distribution of the object, and wherein said transition matrix F is $$\begin{pmatrix} 1 & 0 & 0 & \delta & 0 & 0 & 0 & 0 \\ 0 & 1 & 0 & 0 & \delta & 0 & 0 & 0 \\ 0 & 0 & 1 & 0 & 0 & \delta & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}$$

wherein $\delta$ is a spatial displacement along the object tangent line.

12. A method of segmenting tubular structures in digital images, comprising the steps of:
providing a digitized image comprising a plurality of intensities corresponding to a domain of points on a 3-dimensional grid;
providing a series of measurements of a plurality of points within a tubular object in said image;
defining a current point state about a current point of said plurality of points, said current state comprising a position of said current point, a local orientation of the object about said current point, a cross section model of the object, and an intensity distribution of the voxels within said object;
segmenting said cross section of said tubular object; and
using a Kalman filter to find a next point state based on said current point state and a next measured point in said plurality of points.

13. The method of claim 12, comprising repeating the steps of segmenting said cross section of said tubular object and using a Kalman filter to find a next point state, until each of the series of measurements of said plurality of points has been utilized, wherein said tubular object is defined by the series of segmented cross sections.

14. The method of claim 12, wherein using a Kalman filter to find a next point state comprises defining a transition matrix F for translating said current point position by a spatial displacement along a tangent direction of said tubular object, defining an error covariance P for said current state, predicting a new state and a new error covariance based on said transition matrix, defining noise covariances for said error covariance and said series of point measurements, correcting said state prediction based on said predicted error covariance, a measurement of said predicted point, and said noise covariance of said point measurements, and correcting said error covariance prediction based on said predicted error covariance and said noise covariance of said point measurements.

15. A program storage device readable by a computer, tangibly embodying a program of instructions executable by the computer to perform the method steps for segmenting tubular structures in digital images, said method comprising the steps of:
providing a digitized image comprising a plurality of intensities corresponding to a domain of points on a 3-dimensional grid;
selecting a point within an object in said image, wherein said object is to be segmented;
defining an initial state of said selected point of said object;
performing an initial segmentation of a 2D cross section of said object based on said initial state;
predicting a new state of said object about a new point that is a translation of said selected point along the object tangent;
correcting said new state prediction based on a measurement of said new point in said image; and
segmenting a 2D cross section of said object based on said new state.

16. The computer readable program storage device of claim 15, the method further comprising repeating the steps of predicting a new state of said object, correcting said new state prediction, and segmenting a 2D cross section of said object until the until the object has been completely segmented in said 3D image.

17. The computer readable program storage device of claim 15, wherein a state of a point of an object includes a center position of a vessel, a local orientation of said vessel, a model of the vessel cross section, and a model of the intensity distribution of points within the vessel cross section.

18. The computer readable program storage device of claim 17, wherein the intensity distribution model comprises a mixture of two Gaussians with differing probability weights.

19. The computer readable program storage device of claim 18, wherein said cross section is segmented by a bi-threshold technique.

20. The computer readable program storage device of claim 19, wherein said bi-threshold technique comprises the steps of selecting two thresholds $T_1$ and $T_2$ wherein $T_1 > T_2$, and for each point in the cross section, if the point's intensity value is above $T_1$, segmenting said point, otherwise if the point's intensity value is above $T_2$, segmenting said point if at least one neighboring point's intensity value is above $T_1$.

21. The computer readable program storage device of claim 15, wherein $T_1 = 90\%\%(p_1\%\mu_1 + p_2\%\mu_2)$ and $T_2 = 75\%\% (p_1\%\mu_1 + p_2\%\mu_2)$, wherein $p_1$ and $p_2$ are the probability weights of the two Gaussians, and $\mu_1$ and $\mu_2$ are the mean values of the two Gaussians.

22. The computer readable program storage device of claim 15, the method further comprising initializing an error covariance of said initial state, wherein said covariance is associated with a Gaussian noise, predicting a new error covariance, and correcting said new error covariance prediction, wherein correcting said new state prediction is based on said error covariance prediction.

23. The computer readable program storage device of claim 22, wherein predicting a new state comprises applying a transition matrix to said current state according to $X_{t-1}^{predicted} = F_t X_t$, where X represents said state and F represents said transition matrix, and the predicted error covariance is $P_t^{predicted} = F_{t-1} P_{t-1} F_{t-1}^T + Q_{t-1}$, wherein P represents the error covariance and Q represents a Gaussian noise with zero mean.

24. The computer readable program storage device of claim 23, wherein said measurement is related to said predicted state according to $Z_t = X_t^{predicted} + V$, wherein Z represents the measurement of said state and V represents a Gaussian noise with zero mean, said corrected new state definition comprises $X_t^{corrected} = X_t^{predicted} + P_t^{predicted}(P_t^{predicted} + R_t)^{-1}(Z_t - X_t^{predicted})$, wherein R is a covariance associated with Gaussian noise V, and said corrected error covariance definition comprises $P_t^{corrected} = (I - P_t^{predicted}(P_t^{predicted} + R_t)^{-1}) P_t^{predicted}$, wherein I is the unit matrix.

25. The computer readable program storage device of claim 23, wherein said state vector $X = \{x, y, z, \dot{x}, \dot{y}, \dot{z}, \text{ellipse}, \text{gaussian\_mixture}\}$, wherein $\{x, y, z\}$ represent position of the object center, $\{\dot{x}, \dot{y}, \dot{z}\}$ represents the local orientation of the object, {ellipse} represents the cross section model, and {gaussian_mixture} represents the voxel intensity distribution of the object, and wherein said transition matrix F is $$\begin{pmatrix} 1 & 0 & 0 & \delta & 0 & 0 & 0 & 0 \\ 0 & 1 & 0 & 0 & \delta & 0 & 0 & 0 \\ 0 & 0 & 1 & 0 & 0 & \delta & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{pmatrix}$$

wherein $\delta$ is a spatial displacement along the object tangent line.

* * * * *

UNITED STATES PATENT AND TRADEMARK OFFICE
CERTIFICATE OF CORRECTION

| | | |
|---|---|---|
| PATENT NO. | : 7,602,970 B2 | Page 1 of 1 |
| APPLICATION NO. | : 11/374794 | |
| DATED | : October 13, 2009 | |
| INVENTOR(S) | : Florin et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 883 days.

Signed and Sealed this

Fifth Day of October, 2010

David J. Kappos
*Director of the United States Patent and Trademark Office*